United States Patent [19]
Hann

[11] 3,806,588
[45] Apr. 23, 1974

[54] RECOVERY OF HYDROFLUORIC ACID IN ALKYLATION PROCESSES

[75] Inventor: Paul D. Hann, Bartlesville, Okla.

[73] Assignee: Phillips Petroleum Company, Bartlesville, Okla.

[22] Filed: May 25, 1972

[21] Appl. No.: 256,650

[52] U.S. Cl............................. 423/484, 260/683.41
[51] Int. Cl............................................... C01b 7/22
[58] Field of Search..... 260/683.48, 683.49, 683.51, 260/683.41; 423/484

[56] References Cited
UNITED STATES PATENTS
3,551,515  12/1970  Gentry............................ 260/683.48
2,412,863  12/1946  Bolinger et al. ................ 260/683.48
3,171,865   3/1965  Davison et al.................. 260/683.48
3,223,749  12/1965  VanPool et al. ................ 260/683.48
3,478,125  11/1969  Chapman........................ 260/683.48

Primary Examiner—Delbert E. Gantz
Assistant Examiner—G. J. Crasanakis

[57] ABSTRACT

Propane is employed in the HF rerun zone as a substitute for isobutane to strip HF from the acid-soluble oils, avoiding the losses attendant to the use of isobutane.

9 Claims, 1 Drawing Figure

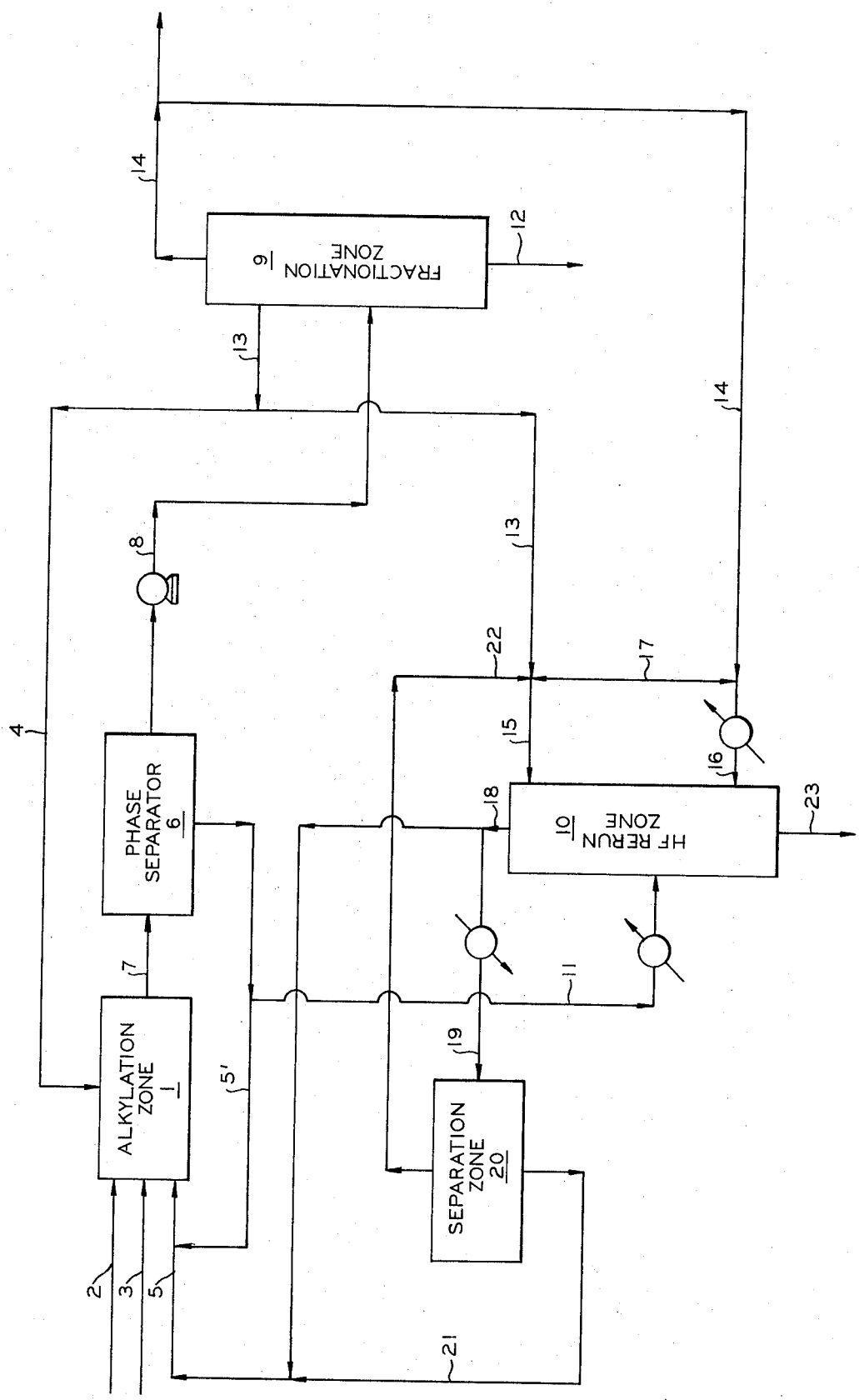

RECOVERY OF HYDROFLUORIC ACID IN ALKYLATION PROCESSES

This invention relates to the recovery of hydrofluoric acid in alkylation processes.

In one of its more specific aspects, this invention relates to an improved method of recovering hydrofluoric acid from acid-soluble oils in hydrofluoric acid alkylation processes.

Alkylation processes employing hydrofluoric acid are well known from disclosures such as that of U.S. Pat. No. 3,171,865, the disclosure of which is incorporated herein by reference. In such processes, an isoparaffin and an olefin are simultaneously brought into contact with hydrofluoric acid to produce alkylate, and the mixture is introduced into a phase separator. From the phase separator a liquid hydrocarbon phase is introduced into a fractionation zone, and a portion of hydrofluoric acid is introduced into an HF rerun zone from which hydrofluoric acid and hydrocarbons are taken overhead, with the acid-soluble oils being separated as the bottoms product. Hydrofluoric acid is soluble in the acid-soluble oils and any retention of hydrofluoric in the soluble oils adds considerably to the process operating costs. Accordingly, it is the practice to introduce hot, vaporous isobutane into the rerun zone to facilitate the stripping of the acid from the oils. However, since isobutane is reactive with components in the soluble oils in the presence of hydrofluoric acid, its introduction into the rerun zone as stripping fluid results in considerable loss of isobutane in the form of additionally formed acid-soluble oils. This disadvantage of the prior art is avoided by the method of the present invention which also possesses distinct advantages over the prior art methods.

According to the present invention, there is provided a method for the recovery of hydrofluoric acid alkylation catalyst contained in an alkylation effluent from HF catalyst-soluble oils which comprises introducing at least a portion of the HF acid phase recovered from the reactor effluent into an HF rerun zone. At least a portion of the HF catalyst is vaporized therein. Propane is introduced into the zone and into contact with the used HF catalyst to strip hydrofluoric acid from the catalyst and hydrofluoric acid vapor and propane are taken overhead from the zone, and the acid-soluble oils are taken from a lower section of the zone.

As mentioned, the method of this invention avoids that loss of isobutane which is incurred when it is used in the HF rerun zone as a stripping agent. The method of the present invention therefore provides an increased yield in alkylate per barrel of isobutane consumed. Further, the production of acid-soluble oils, which are disposed of with some difficulty, is minimized. Also, since propane is of lighter molecular weight and greater partial pressure than isobutane, about 15 percent less propane is required to accomplish comparable results. This, in turn, decreases the load on the fractionation zone wherein the separation is effected. Furthermore, the introduction of propane into the alkylation zone with the hydrofluoric acid tends to shift the equilibrium relating to the reactions occurring therein and to act to decrease the production of propane from the reactants charged to alkylation.

The method of the present invention involves apparatus and operating conditions as are conventional in the recovery of HF alkylation catalyst.

The method of the present invention will be more easily understood if explained in conjunction with the attached figure which depicts the best mode of practicing the invention.

Referring thereto, isobutane feed, olefin feed, liquid isobutane recycle and recycle HF acid are introduced into alkylation zone 1 through conduits 2, 3, 4 and 5, respectively. The effluent from the alkylation zone is transferred to phase separator 6 through conduit 7.

From phase separator 6 the hydrocarbon phase is taken through conduit 8 into fractionation zone 9. The major recycle of HF catalyst is returned to zone 1 through conduit 5'. A slip stream of used HF acid is withdrawn from the phase separator and introduced into HF rerun zone 10 through conduit 11.

From the fractionation zone a plurality of streams are separated. For example, alkylate (containing normal butane) can be taken through conduit 12, with isobutane being taken through conduit 13 and propane being taken through conduit 14.

Several embodiments of the invention can be practiced. In one, liquid isobutane can be introduced into the rerun stripper near the top of the stripper through conduits 13 and 15 and propane vapor can be introduced into the rerun stripper near the bottom of the stripper through conduits 14 and 16. Introduction of isobutane at a point in the stripper sufficiently above the point of introduction therein of the used HF acid avoids any significant contact therebetween in the presence of acid-soluble oils and hence avoids consumption of the isobutane. Such introduction of isobutane allows its use as reflux within the tower.

In another embodiment, liquid propane can be introduced either alone, through conduits 14, 17 and 15 into the stripper, or propane can be introduced in combination with the liquid isobutane as reflux. Propane vapor is also introduced as a stripping agent into near the bottom of the tower through conduits 14 and 16. In all instances, the propane or isobutane can be introduced from the fractionation zone as gaseous streams, as liquids, or as combinations thereof. Preferably, the isobutane is introduced as a liquid and the propane is routed from the fractionation zone as a gaseous stream which is further heated prior to its introduction into the lower portion as the stripping fluid.

Acid-soluble oils are recovered from the stripper through conduit 23 and the vaporous HF and propane stream, containing isobutane if employed, is taken overhead through conduit 18 through which it is introduced by means of conduit 5 into the alkylation zone, or introduced, at least in part, by means of conduit 19 into separation zone 20. In the latter instance, HF is separated and introduced through conduits 21 and 5 into the alkylation zone, and the hydrocarbon liquid is separated and introduced through conduit 22 into the rerun stripper, preferably only through conduit 15 when isobutane is present in this stream.

When only propane is used as liquid reflux, the vaporous overhead stream 18 can be passed, at least in part, via the condenser and into separator 20. The separated HF liquid phase is passed to the reactor through conduits 21 and 5, and the liquid propane is passed through conduit 22 to conduit 15 as reflux, and through conduits 17 and 16 as stripping fluid.

In the preferred operation of the unit, a portion of the used acid is, at least in part, vaporized and charged to the HF rerun column. Liquid isobutane is charged to the top of the column as reflux. Hot propane vapor is introduced into the lower portion of the rerun column. Acid-soluble oil and any water are removed from the bottom of the rerun tower, and recovered HF plus vaporous isobutane and vaporous propane are taken overhead from the tower and returned to the alkylation zone.

The usual operating conditions are employed in the system using the present invention. The rerun unit is operated at a pressure of about 110 psig. Used HF acid is introduced thereinto at about 285°F; vaporous propane is introduced at about 330°F at a sufficient rate to attain an optimum minimum retention of the HF in the acid-soluble oils. Liquid isobutane is employed as reflux at a temperature of about 70°F and the operating temperature at the bottom of the stripper is about 325°F.

The quantity of propane which is employed in this invention is sufficient to replace that isobutane used in the prior art methods and can vary widely depending upon the degree to which it is desired to strip the HF acid from the acid-soluble oils and the capacity of the subsequent fractionation equipment.

It will be evident from the foregoing that various modifications can be made to the method of this invention. Such are considered, however, to be within the scope thereof.

What is claimed is:

1. A method of separating hydrofluoric acid catalyst from acid-soluble oils contained in an alkylation acid stream which comprises:
   a. introducing said alkylation acid stream into a stripping zone and vaporizing a portion of said hydrofluoric acid catalyst from said acid-soluble oils;
   b. introducing propane vapor into contact with said acid-soluble oils and hydrofluoric acid catalyst to strip hydrofluoric acid catalyst from said acid-soluble oils;
   c. withdrawing from the upper portion of said stripping zone a stream comprising hydrofluoric acid and propane; and,
   d. withdrawing from the lower portion of said stripping zone a stream comprising acid-soluble oils.

2. The method of claim 1 in which a first portion of propane is introduced as a liquid into the upper portion of said zone and a second portion of propane is introduced as a vapor into the lower portion of said zone.

3. The method of claim 1 in which said propane is preheated prior to introduction into said zone.

4. The method of claim 1 in which said alkylation acid stream is introduced into said stripping zone at a first locus and isobutane is introduced into said stripping zone at a second locus.

5. The method of claim 4 in which said propane is preheated to a temperature of about 330°F prior to introduction into said zone.

6. The method of claim 2 in which said second portion of propane is preheated prior to introduction into said lower portion of said zone.

7. The method of claim 1 in which propane is separated from hydrofluoric acid in said stream withdrawn from step (c) and said propane is reintroduced into said zone.

8. The method of claim 7 in which said propane is reintroduced into said zone as reflux with isobutane.

9. The method of claim 1 in which said propane introduced into said stripping zone is contained in the overhead stream from a fractionation zone from which alkylate is recovered.

* * * * *